United States Patent
Jang (10) Patent No.: US 8,786,244 B2
(45) Date of Patent: Jul. 22, 2014

(54) SYSTEM AND METHOD FOR CURRENT ESTIMATION FOR OPERATION OF ELECTRIC MOTORS

(75) Inventor: Jihoon Jang, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 390 days.

(21) Appl. No.: 13/241,103

(22) Filed: Sep. 22, 2011

(65) Prior Publication Data

US 2013/0076277 A1      Mar. 28, 2013

(51) Int. Cl.
*H02P 8/36*      (2006.01)

(52) U.S. Cl.
USPC .......................................... 318/634; 318/473

(58) Field of Classification Search
USPC ............ 318/568.22, 609, 610, 621, 623, 632, 318/633, 634, 471–473
See application file for complete search history.

(56) References Cited

U.S. PATENT DOCUMENTS

| | | | | |
|---|---|---|---|---|
| 3,855,509 A | * | 12/1974 | Wright | 318/753 |
| 4,458,193 A | * | 7/1984 | Jonsson | 318/803 |
| 4,626,753 A | * | 12/1986 | Letterman | 388/809 |
| 4,673,860 A | * | 6/1987 | Machuron | 318/812 |
| 4,780,658 A | * | 10/1988 | Koyama | 318/808 |
| 5,703,449 A | | 12/1997 | Nagate et al. | |
| 5,744,921 A | | 4/1998 | Makaran | |
| 5,920,161 A | * | 7/1999 | Obara et al. | 318/139 |
| 6,013,994 A | * | 1/2000 | Endo et al. | 318/432 |
| 6,046,554 A | * | 4/2000 | Becerra | 318/400.34 |
| 6,788,490 B2 | | 9/2004 | Schillaci et al. | |
| 6,870,348 B2 | | 3/2005 | Mijalkovic et al. | |
| 6,894,454 B2 | | 5/2005 | Patel et al. | |
| 7,211,984 B2 | | 5/2007 | Patel et al. | |
| 7,557,530 B2 | | 7/2009 | Tesch et al. | |
| 7,652,441 B2 | | 1/2010 | Ying Yin Ho | |
| 7,768,220 B2 | | 8/2010 | Schulz et al. | |
| 2003/0218444 A1 | | 11/2003 | Marcinkiewicz et al. | |
| 2005/0179264 A1 | | 8/2005 | Ganev | |
| 2006/0097688 A1 | | 5/2006 | Patel et al. | |

(Continued)

FOREIGN PATENT DOCUMENTS

CN      1976213 A      12/2010

OTHER PUBLICATIONS

Office Action dated Oct. 25, 2010, issued in U.S. Appl. No. 12/017,817.

(Continued)

*Primary Examiner* — Bentsu Ro
(74) *Attorney, Agent, or Firm* — Ingrassia Fisher & Lorenz, P.C.

(57) ABSTRACT

Methodologies and systems are provided for current estimation in electric motor. The system comprises an electric motor having sensors for sensing at least motor current, motor temperature and motor speed. A vehicle controller is coupled to the sensors and includes a closed-loop current control system for the electric motor having a current compensation circuit for providing a current compensation signal that is used to adjust a current command for the electric motor. The current compensation circuit includes a short-circuit current calculator for providing a short-circuit current value based upon the motor temperature and the motor speed, a compensation gain calculator for providing a gain compensation value based upon the motor speed, and circuitry for combining the motor current, the short-circuit current value and the gain compensation value to provide the current compensation signal. Methods for current estimation in electric motor are also provided.

19 Claims, 5 Drawing Sheets

(56) References Cited

U.S. PATENT DOCUMENTS

| | | |
|---|---|---|
| 2006/0119312 A1 | 6/2006 | Okamura et al. |
| 2007/0145939 A1 | 6/2007 | Tajima et al. |
| 2007/0164694 A1 | 7/2007 | Boscolo Berto |
| 2009/0140676 A1 | 6/2009 | Son et al. |
| 2009/0184678 A1 | 7/2009 | Son et al. |
| 2009/0189561 A1 | 7/2009 | Patel |
| 2010/0064706 A1 | 3/2010 | Hattori et al. |
| 2010/0295500 A1 | 11/2010 | Chakrabarti et al. |
| 2011/0050141 A1 | 3/2011 | Yeh et al. |
| 2011/0095713 A1 | 4/2011 | Son et al. |
| 2011/0140646 A1 | 6/2011 | Campbell et al. |

OTHER PUBLICATIONS

Mellor, P.H., et al. "Lumped parameter thermal model for electrical machines of TEFC design," IEEE Proceedings on Electric Power Applications, Sep. 1991, pp. 205-218, vol. 138, No. 5.

Asaii, B., et al. "A new thermal model for EV induction machine drives," IEEE Power Electronics in Transportation, Oct. 1996, pp. 175-182.

Gao, Z., et al. "A sensorless adaptive stator winding temperature estimator for mains-fed induction machines with continuous-operation periodic duty cycles," IEEE Transactions on Industry Applications, Sep./Oct. 2008, pp. 1533-1542, vol. 44, No. 5.

Briz, F., et al. "Temperature estimation in inverter-fed machines using high-frequency carrier signal injection," IEEE Transactions on Industry Applications, May/Jun. 2008, pp. 799-808, vol. 44, No. 3.

Al-Tayie, J.K., et al. "Estimation of speed, stator temperature and rotor temperature in cage induction motor drive using the extended kalman filter algorithm," IEEE Proceedings in Electric Power Applications, Sep. 1997, pp. 301-309, vol. 144, No. 5.

Colby, R.S., et al. "A model reduction perspective on thermal models for induction machine overload relays," IEEE Transactions on Industrial Electronics, Oct. 2008, pp. 3525-3534, vol. 55, No. 10.

Yeh, C-C., et al. "Electric Motor Stator Winding Temperature Estimation Systems and Methods," U.S. Appl. No. 12/778,733, filed May 12, 2010.

Pan, H., et al. "Improving the start and restart behavior through state recognition of AC drives," IEEE Proceeding of the Power Conversion Conference, Aug. 3-6, 1997, pp. 589-594, vol. 2.

Taniguchi, S., et al. "Starting Procedure of Rotational Sensorless PMSM in the Rotating Condition," IEEE Transactions on Industry Applications, Jan.-Feb. 2009, pp. 194-202, vol. 45, No. 1.

Son, Y-C., et al. "Sensorless Operation of Permanent Magnet Motor Using Direct Voltage Sensing Circuit," IEEE Transactions on Industry Applications, 2002, pp. 1674-1678, vol. 3.

Office Action dated Nov. 17, 2010, issued in Chinese Patent Application No. 200910002790.6.

Office Action dated Aug. 18, 2011 for U.S. Appl. No. 11/947,501.

Schulz, S.E. et al. "Harmonic Torque Ripple Reduction at Low Motor Speeds," U.S. Appl. No. 12/108,868, filed Apr. 24, 2008.

Yim, Jung-Sik et al. "Modified Current Control Schemes for High-Performance Permanent-Magnet AC Drives with Low Sampling to Operating Frequency Ratio", IEEE Transactions on Industry Applications, Mar./Apr. 2009, pp. 763-771, vol. 45, No. 2.

\* cited by examiner

SYSTEM AND METHOD FOR CURRENT ESTIMATION FOR OPERATION OF ELECTRIC MOTORS

TECHNICAL FIELD

The technical field generally relates to systems and methodologies for a drive system for electric and hybrid electric vehicles, and more particularly, to systems and methodologies for current estimation for controlling an electric motor in an electric vehicle.

BACKGROUND

Electric and hybrid electric vehicles use alternating current (AC) motor drives to provide torque to a motor shaft that drives the wheels of the vehicle. In practice, the amount of torque produced by the motor is directly related (although not perfectly proportional) to the amount current provided to the motor. Therefore, by regulating and precisely controlling the input current to the electric motor, the amount of torque produced by the electric motor may be more accurately controlled. However, in many systems, the input motor current is not directly controlled. For example, many electric motors are operated using pulse-width modulation (PWM) techniques in combination with an inverter (or another switched-mode power supply) to control the voltage across the motor windings, which in turn, produces the desired current in the motor.

In response to a requested torque (or commanded torque), conventional engine control systems determine a desired input motor current for producing the requested amount of torque and utilize a closed loop control system to control the current through the motor windings and thereby attempt to regulate the amount of torque produced the motor. One or more sensors are used to measure the actual motor current, which is then compared to the desired input motor current. Based on the outcome of the comparison, the PWM commands for the inverter are adjusted to increase and/or decrease the voltage across the motor windings, such that the actual measured motor current tracks the desired input motor current as closely as possible.

However, when a current sensor does not accurately reflect the motor current, these closed-loop control systems can no longer effectively control the motor. For example, without accurate motor current information, the control system may cause the motor to produce insufficient torque, excessive torque, or varying or oscillating amounts of torque. Consequently, the use and enjoyment of a vehicle is adversely affected when current sensor measurement errors occur or when the control system cannot adequately compensate for such errors.

Accordingly, it is desirable to provide a simple, reliable and cost effective solution for current estimation in electric or hybrid electric vehicles. Additionally, other desirable features and characteristics of the present invention will become apparent from the subsequent description taken in conjunction with the accompanying drawings and the foregoing technical field and background.

BRIEF SUMMARY

In accordance with an exemplary embodiment, a method for current estimation for an electric motor is provided. The method comprises providing a current compensation signal for a closed loop current control system for a motor of a vehicle based upon measured currents in the motor, motor speed and motor temperature, and then adjusting a current command signal using the current compensation signal to control current provided to the motor of the vehicle.

In accordance with another exemplary embodiment, a system is provided for current estimation for an electric motor. The system comprises an electric motor having sensors for sensing at least motor current, motor temperature and motor speed. A vehicle controller is coupled to the sensors and includes a closed-loop current control system for the electric motor having a current compensation circuit for providing a current compensation signal that is used to adjust a current command for the electric motor. The current compensation circuit includes a short-circuit current calculator for providing a short-circuit current value based upon the motor temperature and the motor speed, a compensation gain calculator for providing a gain compensation value based upon the motor speed, and circuitry for combining the motor current, the short-circuit current value and the gain compensation value to provide the current compensation signal.

DESCRIPTION OF THE DRAWINGS

The inventive subject matter will hereinafter be described in conjunction with the following drawing figures, wherein like numerals denote like elements, and.

DETAILED DESCRIPTION

The following detailed description is merely exemplary in nature and is not intended to limit the subject matter of the disclosure or its uses. Furthermore, there is no intention to be bound by any expressed or implied theory presented in the preceding technical field, background, brief summary or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Additionally, the following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Finally, for the sake of brevity, conventional techniques and components related to vehicle electrical parts and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention. It should also be understood that FIGS. 1-7 are merely illustrative and may not be drawn to scale.

Figure 1:
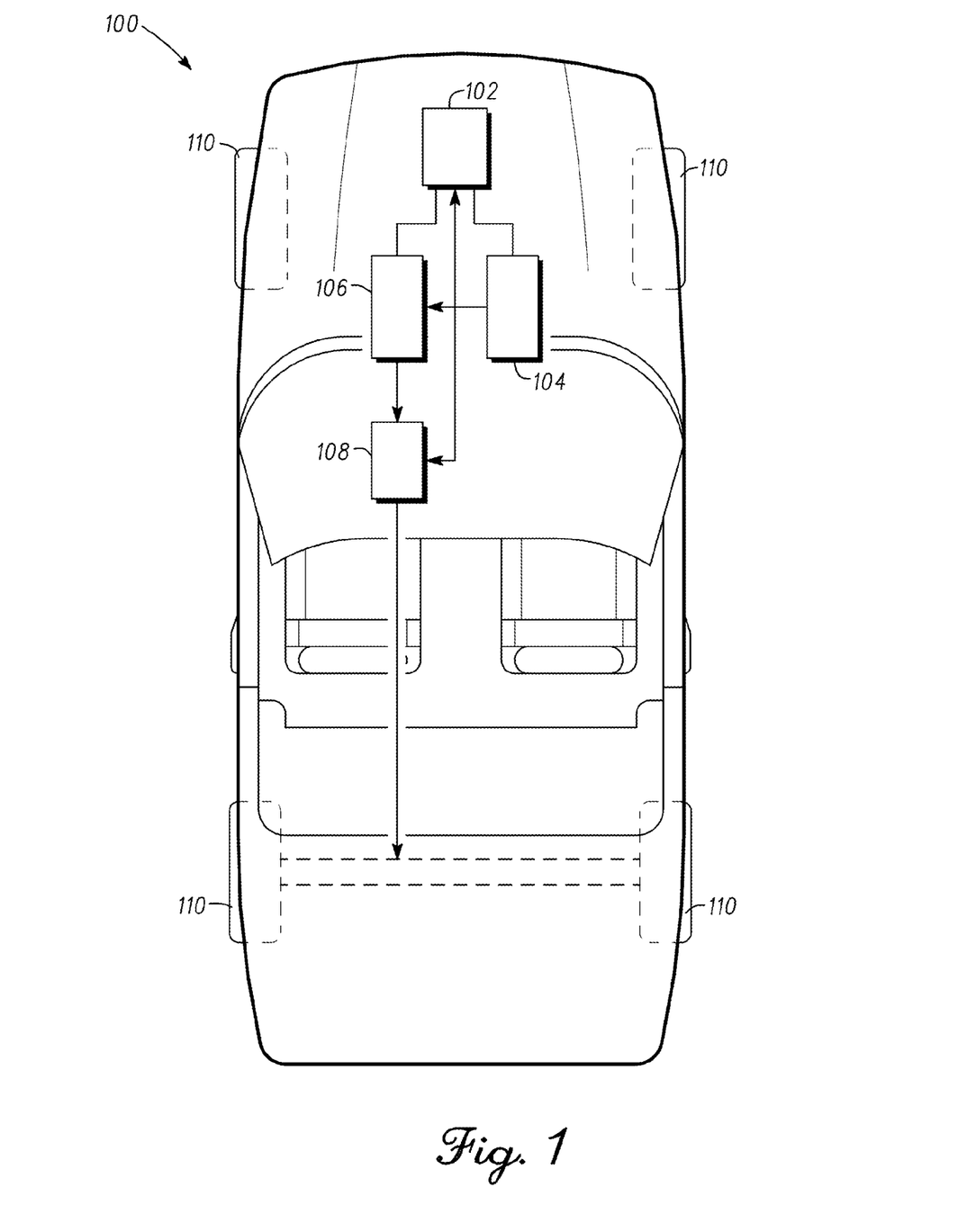
FIG. 1 is an illustration of a vehicle suitable for using exemplary embodiments of the present disclosure.

FIG. 1 is a simplified schematic representation of an embodiment of a vehicle 100 according to the present disclosure. Although vehicle 100 is illustrated as a purely electric vehicle, the techniques and concepts described herein are also applicable to hybrid electric vehicles. The illustrated embodiment of vehicle 100 includes, without limitation: a vehicle control module 102 coupled to an onboard generator 104; an onboard energy storage system 106; and an electric propulsion system 108 driving wheels 110.

The vehicle control module 102 may include any type of processing element or vehicle controller, and may be equipped with nonvolatile memory, random access memory (RAM), discrete and analog input/output (I/O), a central processing unit, and/or communications interfaces for networking within a vehicular communications network. In an electric vehicle embodiment, onboard generator 104 may comprise a small gas (or other liquid fuel) powered generator sufficient to charge the energy storage system 106 if needed. In a hybrid electric vehicle embodiment, generator 104 may be powered by or part of the vehicle gas (or other fuel) engine used to propel the vehicle. Onboard energy storage system 106 may be realized as a rechargeable battery pack having a single battery module or any number of individual battery modules. Onboard energy storage system 106 provides electrical energy that enables electric propulsion system 108 to provide power to wheels 110.

While FIG. 1 depicts various electrical and mechanical connections and couplings in a very simplified manner for ease of description, an actual embodiment of vehicle 100 will of course utilize additional physical components and devices that are well known in the automotive industry. For example, numerous conventional accessories would be included in a commercially available vehicle such as window or mirror defoggers, anti-lock brake systems, traction or stability systems, lighting systems, warning systems (e.g., horn), turn indicators (signals), air conditioning, heated seats, video/audio systems, and power outlet ports for user devices (collectively, accessories). Also, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 100 may also incorporate any one of, or combination of, a number of different types of engines, such as, for example, a gasoline or diesel fueled combustion engine, a flex fuel vehicle (FFV) engine (i.e., an engine that uses a mixture of gasoline and alcohol) or a gaseous compound (e.g., hydrogen and/or natural gas) fueled engine.

Figure 2:
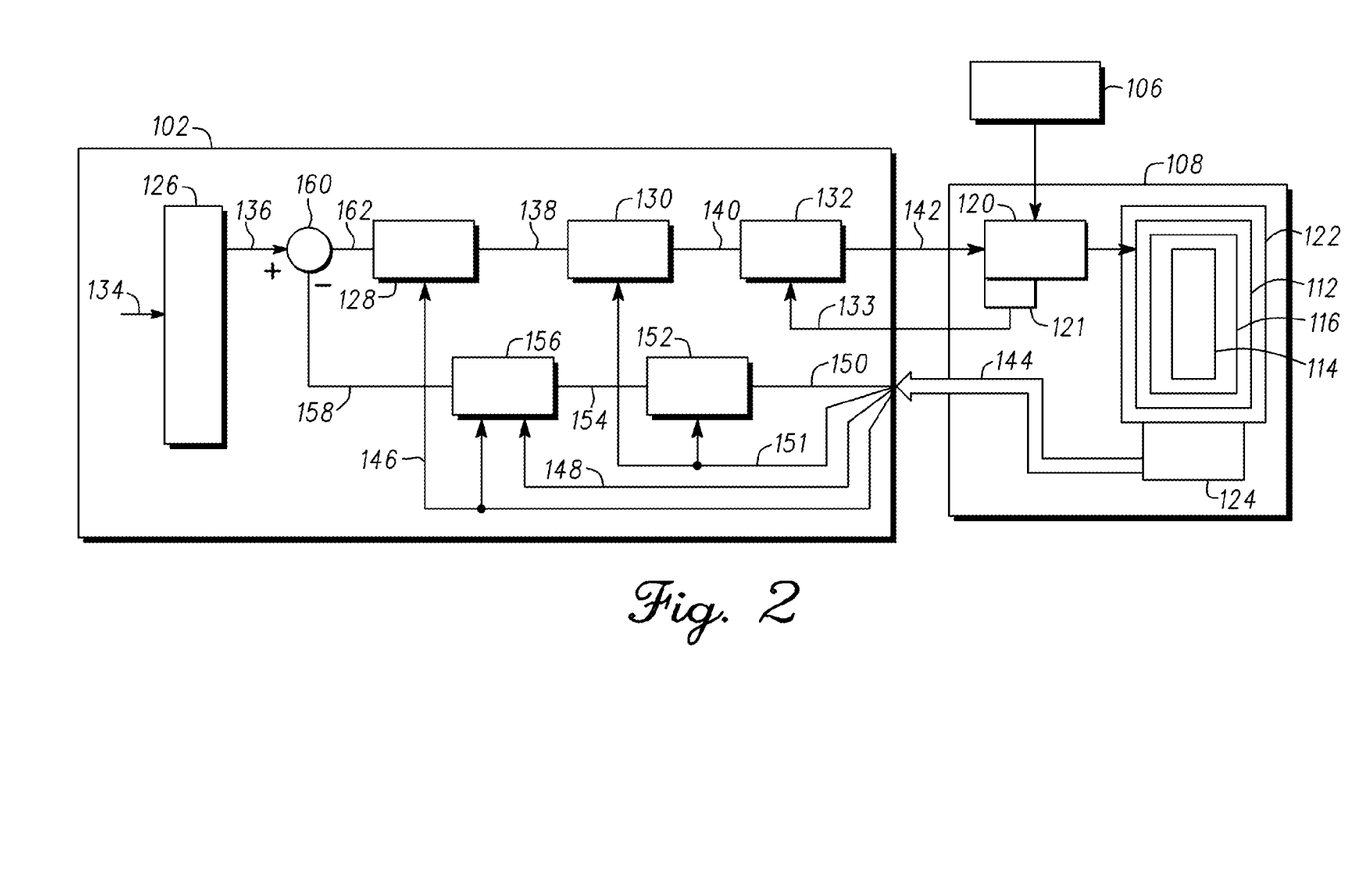
FIG. 2 is a more detailed illustration of some components of the vehicle of FIG. 1.

FIG. 2 is a more detailed block diagram of selected components of the vehicle 100 in accordance with an exemplary embodiment. In one exemplary embodiment, the electric propulsion system 108 includes an electric (AC) motor 112 having a stator 116 and a rotor 114, an inverter assembly 120, a cooling system 122 and one or more sensors 124.

The vehicle control module 102 is illustrated in more detail as including a closed-loop current control system including a system controller 126, a current controller 128, a coordinate transformation block 130 and a pulse width modulator (PWM) 132. The system controller 126 is configured to obtain a torque command (T) 134 and generate current commands ($i^*_{dq}$) 136 for the current controller, which are adjusted (160) as described in more detail below to provide an adjusted signal 162 to the current controller 128. The current controller 128 uses the adjusted signal 162 and the measured motor speed 146 to generate voltage command signals ($v^*_{dq}$) 138, that are processed together with the measured rotor position 151 by the coordinate transformation block 130 to generate pulse width modulator command signals ($v^*_{abc}$) 140 for operating the inverter 120 via PWM signals 142. In this way, the torque produced by the electric motor 112 tracks the torque command (T). The pulse width modulator (PWM) 132 receives an additional input 133 from a voltage sensor 121 which measures the voltage across the dc-bus in the inverter 120 in order to generate PWM signals 142 as is known in the art.

In the exemplary embodiment illustrated in FIG. 2, the vehicle control module 102 receives inputs 144 from several sensors 124. Among these are the measured rotor position 151, measured motor speed 146, measured motor temperature 148 and measured motor currents 150. In some embodiments, the measured motor speed 146 may be replaced by an estimated motor speed using a conventional speed estimation scheme depending on the motor control system employed in any particular design. The measured motor currents ($i_{abc}$) are processed with the measured rotor position 151 via another coordinate transformation block 152 to provide d-q referenced signals ($i_{dq}$) 154 to a current compensator 156 which forms a portion of the closed-loop current control system.

According to exemplary embodiments of the present disclosure, the current compensator 156 provides a current compensation signal ($i_{dqcomp}$) 158, (i.e., the estimate of the average currents of the motor) that is subtracted (160) from the current commands ($i^*_{dq}$) 136 to provide an adjusted current command signal 162 that compensates for errors between the measured currents 150 and the average currents of the motor 112. Such errors are known to increase as the operating frequency of the inverter 120 increases relative to the measurement (sampling) frequency used to produce the measured current signal 150. These errors degrade the accuracy and the stability of the current controller 128, which in turn, affects overall torque control of the motor 112.

The motor 112 may be a multi-phase alternating current (AC) motor that generally includes a rotor 114 and a stator 116 with windings or coils that may be grouped to correspond to operating phases. The inverter assembly 120 drives the operation of the motor 112 and generally includes one or more inverters, each including switches with antiparallel diodes. In various embodiments, the switches are implemented with insulated gate bipolar transistors (IGBTs), metal oxide semiconductor field effect transistors (MOSFETs), and/or the like. The windings of the stator 116 are electrically coupled between the switches of the inverter assembly 120 to receive current and generate torque in the motor 112. In one exemplary embodiment, the inverter assembly 120 provides alternating phase currents to drive three-phases of the motor 112 at varying speeds based on the output voltage ($V_{DC}$) of the power source 106 and control signals 142 from the controller 102.

A cooling system 122 with a coolant, such as motor oil, surrounds and cools the motor 112 during operation. The sensors 124 may include any suitable type of sensor for collecting information within the propulsion system 108 for use by the controller 102. For example, the sensors 124 may determine or otherwise derive motor temperature, motor current, motor speed, rotor positions ($\theta_r$), rotor speeds ($\omega_r$), and other parameters used as inputs 144 for the vehicle control module 102.

Figure 3:
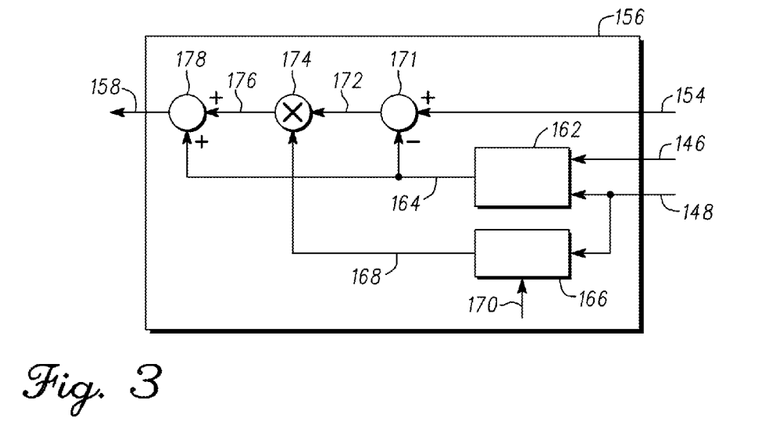
FIG. 3 is a block diagram illustrating of the operation of the current compensator of FIG. 2 in accordance with an exemplary embodiment.

FIG. 3 is a block diagram providing a more detailed illustration of the current compensator 156. As previously mentioned, the current compensator 156 accepts as inputs the measured motor temperature ($T_{mot}$) 146, the measured motor speed ($N_{mot}$) 148 and the measured motor currents ($i_{dq}$) 154 and provides a current compensation signal ($i_{dqcomp}$) 158. The measured motor temperature ($T_{mot}$) 146 and the measured motor speed ($N_{mot}$) 148 are used by a short-circuit current calculator 162 (discussed in more detail below in conjunction with FIG. 4) to determine or calculate a short-circuit current signal ($i_{dq,sc}$) 164. Additionally, the measured motor speed ($N_{mot}$) 148 is used by a compensation gain calculator 166 (discussed in more detail in conjunction with FIG. 5) with the amount of the sampling period ($T_{samp}$) 170 to provide a compensation gain factor ($K_\delta$) 168. In exemplary embodiments, the sampling period is the same as the sampling period used in the motor sensors (124 in FIG. 2) for measuring the motor currents 150 and the rotor position 151. The short-circuit current signal ($i_{dq,sc}$) 164 is subtracted (in 171) from the coordinate transformed measured currents 154, the result (172) of which is multiplied 174 by the compensation gain factor ($K_\delta$) 168. This result (176) is then added (178) to the short-circuit current signal ($i_{dq,sc}$) 164 to produce the compensation current signal ($i_{dqcomp}$) 158.

Figure 4:
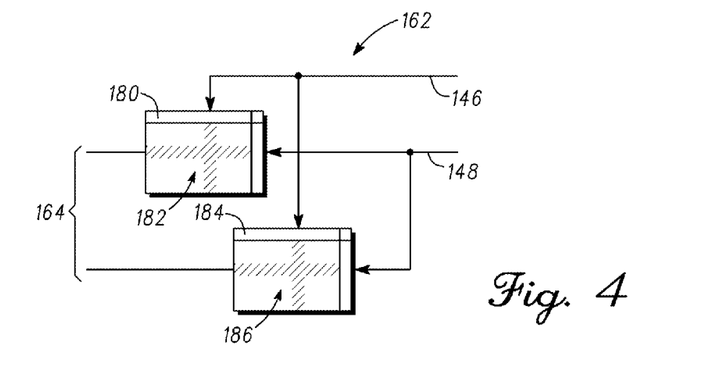
FIG. 4 is a block diagram illustrating of the operation of the short-circuit current calculator of FIG. 3 in accordance with an exemplary embodiment.

FIG. 4 is a block diagram providing a more detailed illustration the short-circuit current calculator 162. In one embodiment, the short-circuit current calculator, applies the measured motor temperature ($T_{mot}$) 146 and the measured motor speed ($N_{mot}$) 148 to a two dimensional look-up table 180 to determine a value 182 that is provides as the d-axis short-circuit current ($i_{d,sc}$) component. Additionally, the measured motor temperature ($T_{mot}$) 146 and the measured motor speed ($N_{mot}$) 148 to a two dimensional look-up table 184 to determine a value 186 that is provides as the q-axis short-circuit current ($i_{q,sc}$) component. Together, the d-axis short-circuit current ($i_{d,sc}$) component and the q-axis short-circuit current ($i_{d,sc}$) component comprise the short-circuit current signal ($i_{dq,sc}$) 164. Values for the two dimensional look-up tables 180 and 184 are produced by the following equations for a permanent magnet motor embodiment:

$$I_{d,SC} = -\frac{\omega_r^2 L_q \lambda_{PM}}{R_s^2 + \omega_r^2 L_d L_q}$$

$$I_{q,SC} = -\frac{\omega_r R_s \lambda_{PM}}{R_s^2 + \omega_r^2 L_d L_q}$$

where,

| | |
|---|---|
| $I_{d,SC}$ | D-axis Steady-state Short-circuit Current |
| $I_{q,SC}$ | Q-axis Steady-state Short-circuit Current |
| $L_d$ | D-axis Static Inductance |
| $L_q$ | Q-axis Static Inductance |
| $R_s$ | Stator Resistance |
| $i_d$ | D-axis Current |
| $i_q$ | Q-axis Current |
| $v_d$ | D-axis Voltage |
| $v_q$ | Q-axis Voltage |
| $\lambda_{PM}$ | Flux-linkage of the Permanent-magnet |
| $\omega_r$ | Rotor electrical Frequency |

In a three-phase induction motor embodiment, the values for the two dimensional look-up tables 180 and 184 are produced by the following equations:

$$I_{d,SC} = -\frac{\omega_e^2 L_\sigma \lambda_{dr}}{R_s^2 + \omega_e^2 L_\sigma^2} \frac{L_m}{L_r}$$

$$I_{q,SC} = -\frac{\omega_e R_s \lambda_{dr}}{R_s^2 + \omega_e^2 L_\sigma^2} \frac{L_m}{L_r}$$

where,

| | |
|---|---|
| $I_{d,SC}$ | D-axis Steady-state Short-circuit Current |
| $I_{q,SC}$ | Q-axis Steady-state Short-circuit Current |
| $L_m$ | Magnetizing Inductance |
| $L_r$ | Rotor Inductance |
| $L_s$ | Stator Inductance |
| $L_\sigma$ | Stator Transient Inductance |
| $R_s$ | Stator Resistance |
| $i_d$ | D-axis Current |
| $i_q$ | Q-axis Current |
| $v_d$ | D-axis Voltage |
| $v_q$ | Q-axis Voltage |
| $\lambda_{dr}$ | D-axis Rotor Flux |
| $\omega_e$ | Synchronous Frequency |

In another embodiment, the short-circuit current calculator 162 includes a processor that calculates the d-axis short-circuit current ($i_{d,sc}$) component and the q-axis short-circuit current ($i_{q,sc}$) component from the above equations to provide the short-circuit current signal ($i_{dq,sc}$) 164.

Figure 5:
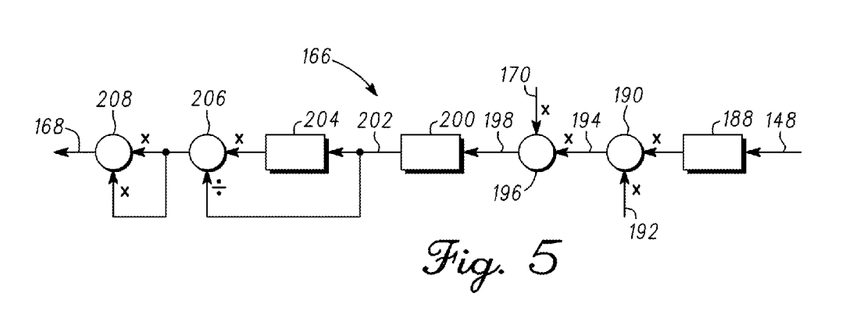
FIG. 5 is a block diagram illustrating of the operation of the compensation gain calculator of FIG. 3 in accordance with an exemplary embodiment.

Referring now to FIG. 5, a block diagram providing a more detailed illustration the compensation gain calculator 166 is shown. The compensation gain calculator 166 applies the measured motor speed ($N_{mot}$) 148 to a scaling factor 188, that in one embodiment comprises a $2\pi/60$ scaling factor which is based upon the unit conversion from rotations per minute to radians per second. The scaled (188) measured motor speed is multiplied (190) by the number of pole pairs 192 of the motor magnets. For example, if the motor (112 of FIG. 2) has six magnets, it would have six pole pairs. The result 194 is multiplied by the amount of the sampling period ($T_{samp}$) 170. The multiplied signal 198 is divided by two (200), and the trigonometric sine is taken (204), which is then divided (206) by the divided signal 202. That result is squared (208) to produce the compensation gain factor ($K_\delta$) 168.

Figure 6A:
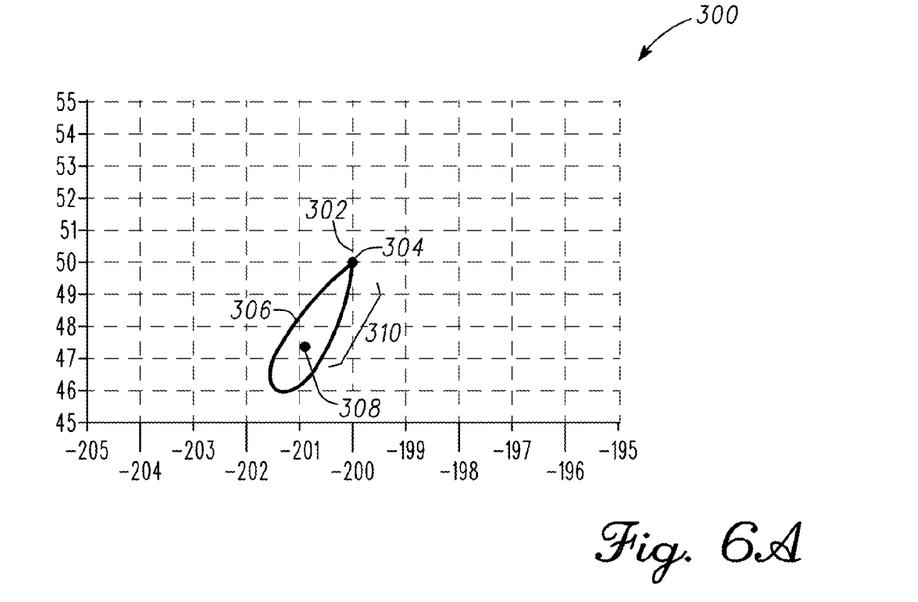
FIGS. 6A and 6B are charts comparing current error with and without the current compensator of the exemplary embodiments of the present disclosure.

Referring now to FIG. 6A, a chart 300 illustrating the error produced using a closed-loop current control system (see FIG. 2) without the current compensator 156 is shown. The X-axis of the chart 300 plots the $i_d$ current while the Y-axis plots the $i_q$ current. As can be seen, the commanded current 302 substantially coincides with the measured current 304, however without the current compensator 156 of the present disclosure, the average (308) of the actual currents 306 deviates by an error amount 310 from the measured current 304.

Figure 6B:
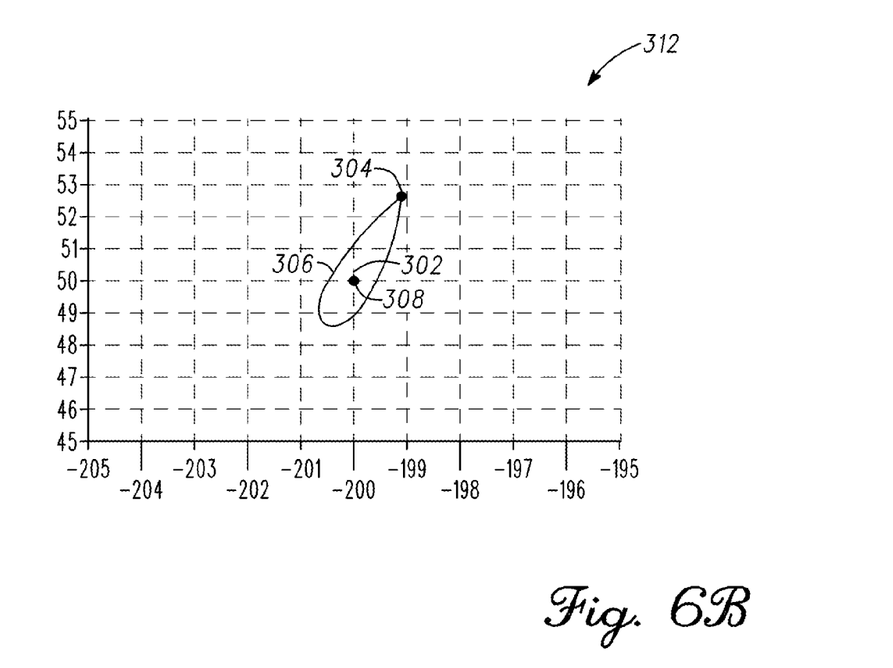

When, using the current compensator 156, FIG. 6B presents a chart 312 where the commanded current 302 substantially coincides with the average (308) of the actual currents 306, and the error 310 from the measured current 304 has been substantially eliminated. Since the current error can be so substantially eliminated, the closed-loop current control system of the present disclosure offers the advantage of reducing the switching frequency of the inverters (120 of FIG. 2) providing increased efficiency. That is, inverter efficiency is known to decrease as the switching frequency increases because higher switching frequency generates higher switching loss. However, in convention systems (see results illustrated in FIG. 6A), the error amount 310 is known to increase as the rate of motor speed to the switching frequency increases. Accordingly, there is a limitation in conventional system for reducing the switching frequency where the maximum value of motor speed is already decided. Conversely, exemplary embodiments of the present disclosure offers the advantage of the reducing the switching frequency for the same maximum value of motor speed by drastically reducing the error amount of 310 as illustrated in FIG. 6B.

Figure 7A:
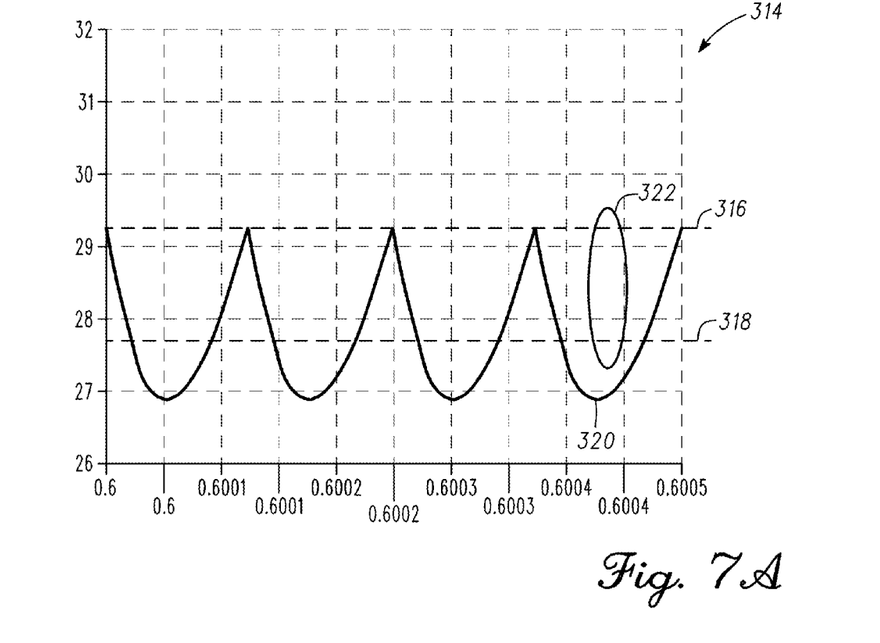
FIGS. 7A and 7B are charts comparing torque error with and without the current compensator of the exemplary embodiments of the present disclosure.
Figure 7B:
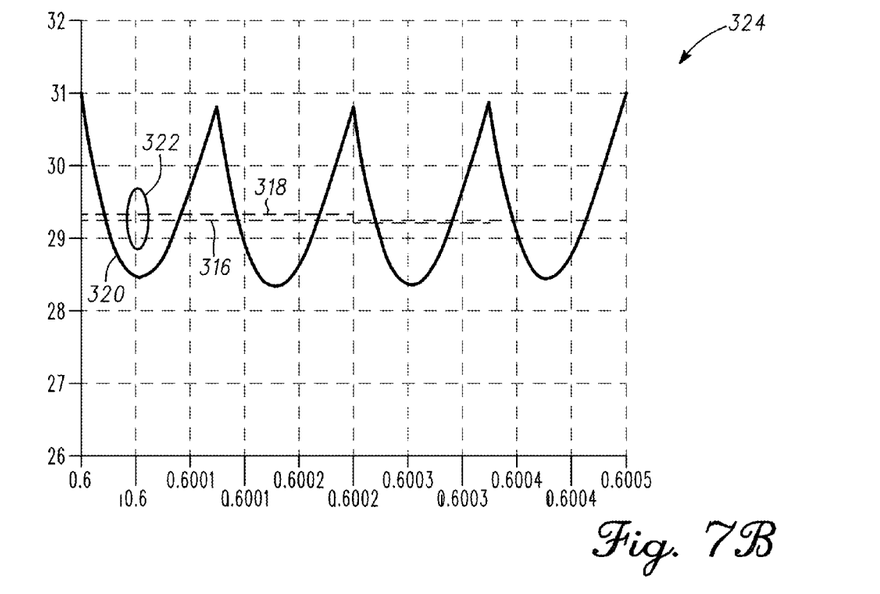

Since the current error 310 is known to cause torque error, FIG. 7A shows a chart 314 having time along the X-axis and torque (in Newton-meters (Nm)) along the Y-axis to compare torque error with and without the current compensator 156. As can be seen, the commanded torque 316 differs from the average (318) of the actual torque 320 by an error amount 322 of approximately 1.5 Nm without the use of the current compensator 156. Using the current compensator 156, FIG. 7B presents a chart 324 illustrating that the torque error 322 is reduced to approximately zero-Nm, thus providing a substantial improvement in torque control.

Accordingly, a current estimation system and method is provided that employs a current compensator in a closed-loop control system that substantially improves current estimation and torque performance. Moreover, the current compensator offers the advantage of reducing the switching frequency of the inverters (120 of FIG. 2) providing increased efficiency.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing summary and detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method, comprising:
providing a current compensation signal for a closed loop current control system for a motor of a vehicle based upon measured currents in the motor and a short-circuit current value from a two dimensional lookup table using a motor speed and a motor temperature; and
adjusting a current command signal using the current compensation signal to control current provided to the motor of the vehicle.

2. The method of claim 1, determining a short-circuit current value further comprises providing a short-circuit $i_d$ value from a second two dimensional lookup table.

3. The method of claim 1, wherein providing the current compensation signal further comprises determining a compensation gain value using the motor temperature.

4. The method of claim 2, wherein providing the current compensation signal further comprises determining the current compensation signal from the short-circuit current value and the compensation gain value.

5. The method of claim 3, wherein the compensation gain value is based upon the number of magnet pole pairs of the motor.

6. A method, comprising:
sensing an electric motor during operation to provide measured motor current, motor temperature and motor speed;
providing a current compensation signal based upon the measured motor current and a short-circuit current value from a two dimensional lookup table using a motor temperature and a motor speed;
adjusting a current command signal to provide an adjusted current command signal;
processing the adjusted current command signal in a closed-loop current control system to control the operation of the electric motor.

7. The method of claim 6, wherein determining a short-circuit current value further comprises providing a short-circuit $i_d$ value from a second two dimensional lookup table.

8. The method of claim 6, determining a short-circuit current value further comprises computing a short-circuit $i_d$ value from the equation:

$$I_{d,SC} = -\frac{\omega_r^2 L_q \lambda_{PM}}{R_s^2 + \omega_r^2 L_d L_q}.$$

9. The method of claim 6, wherein determining a short-circuit current value further comprises computing a short-circuit $i_q$ value from the equation:

$$I_{q,SC} = -\frac{\omega_r R_s \lambda_{PM}}{R_s^2 + \omega_r^2 L_d L_q}.$$

10. The method of claim 6, wherein providing the current compensation signal further comprises determining a compensation gain value using the motor temperature.

11. The method of claim 10, wherein providing the current compensation signal further comprises determining the current compensation signal from the short-circuit current value and the compensation gain value.

12. The method of claim 10, wherein the compensation gain value is based upon the number of magnet pole pairs of the motor.

13. A vehicle, comprising:
an electric motor;
sensors coupled to the electric motor for sensing at least motor current, motor temperature and motor speed;
a vehicle controller coupled to the sensors and including a closed-loop current control system for the electric motor;
a current compensation circuit within the closed-loop current control system for providing a current compensation signal to adjust a current command for the electric motor, the current compensation circuit comprising:
a short-circuit current calculator for providing a short-circuit current value based upon the motor temperature and the motor speed;

a compensation gain calculator for providing a gain compensation value based upon the motor speed; and circuitry for combining the motor current, the short-circuit current value and the gain compensation value to provide the current compensation signal.

14. The vehicle of claim 13, wherein the short-circuit current calculator includes a two-dimensional lookup table to provide an $i_q$ component of the short-circuit current value.

15. The vehicle of claim 14, wherein the two-dimensional lookup table to provide an $i_q$ component of the short-circuit current value includes $i_q$ values computed by the equation:

$$I_{q,SC} = -\frac{\omega_r R_s \lambda_{PM}}{R_s^2 + \omega_r^2 L_d L_q}.$$

16. The vehicle of claim 13, wherein the short-circuit current calculator includes a two-dimensional lookup table to provide an $i_d$ component of the short-circuit current value.

17. The vehicle of claim 16, wherein the two-dimensional lookup table to provide an $i_d$ component of the short-circuit current value includes $i_d$ values computed by the equation:

$$I_{d,SC} = -\frac{\omega_r^2 L_q \lambda_{PM}}{R_s^2 + \omega_r^2 L_d L_q}.$$

18. The vehicle of claim 13, wherein the closed-loop current control system controls an inverter coupled to a battery and the electric motor.

19. The vehicle of claim 13, wherein the compensation gain value is based upon the number of magnet pole pairs of the motor.

* * * * *